Feb. 25, 1941.   J. H. VICTOR   2,233,147
OIL SEAL CONSTRUCTION
Filed Aug. 17, 1939
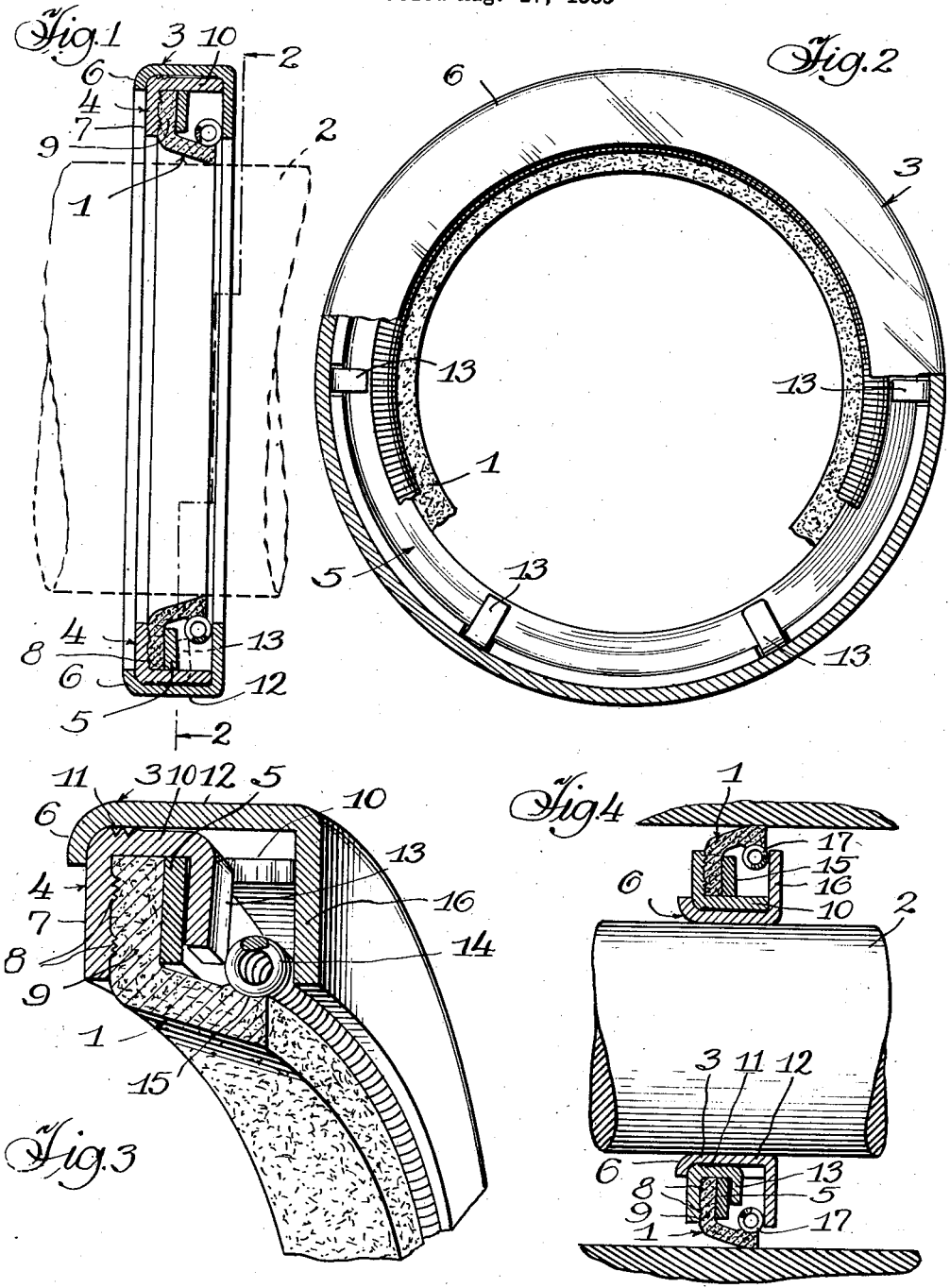
INVENTOR.
John H. Victor,
BY Parkinson & Lane
ATTORNEYS.

Patented Feb. 25, 1941

2,233,147

UNITED STATES PATENT OFFICE 2,233,147

OIL SEAL CONSTRUCTION

John H. Victor, Wilmette, Ill., assignor to Victor Manufacturing & Gasket Company, Chicago, Ill., a corporation of Illinois Application August 17, 1939, Serial No. 290,551

4 Claims. (Cl. 288—3)

The present invention relates to an oil seal or grease retainer and more particularly to a novel retaining shell for anchoring and securely retaining a sealing element adapted to have a wiping and sealing contact with an encompassing shaft, or with a surrounding or adjoining housing where the shell is mounted upon the shaft, for sealing the space between these relatively rotatable parts against the escape or passage of oil, grease, or other lubricants, water and cooling liquids or fluids, and against the entrance of dust and other foreign particles.

In an oil seal or grease retainer of the type disclosed, it is essential that the sealing diaphragm be maintained in continuous wiping or sealing contact with the surface to be sealed so as to effectively prevent leakage or escape of the fluid to be retained, as well as to exclude dust and other foreign particles. In order to accomplish this, it is highly essential that the diaphragm be securely anchored against any relative movement or displacement with respect to its retaining shell. In the present invention, I provide the retaining shell with a novel means for locking or anchoring an annular flange of the sealing diaphragm securely within the shell and with the cooperating parts so constructed and arranged as to not only effectively prevent the passage of oil, grease or other lubricant or fluid thereabout, but also to positively prevent their passage through the interengaging or contacting portions of the shell or retainer construction.

The novel retaining shell comprises an outer and an inner annular section or shell member, each substantially L-shaped in cross section and telescoped by a press fit, with the inner member adapted to receive and clamp a sealing diaphragm between it and an annular member or washer, and the latter being of spring metal and preferably slightly coned or bevelled and maintained or anchored in this position by means of a suitable number of spaced, overlapping prongs or projections bent from the inner channel or shell. This novel clamping means secures the sealing diaphragm wholly within the inner section or shell member and completely out of contact with the outer section or shell member. This makes for a more efficient, permanent and effective retainer for a sealing diaphragm, and regardless of whether such diaphragm is constructed of a plastic, leather or other material suitable for the purpose, the novel washer will permanently retain it with a spring tension compensating for any possible expansion or contraction.

In order to eliminate all possibility of leakage through or around the shell or retainer, the present construction provides a double wall on the anchoring edge of the shell or retainer which adds greatly to the strength of the seal and permits it to retain its fit and dimensions under any and all conditions of service.

In the preferred embodiment, the inner shell or channel member is provided with one or more continuous, circumferential beads or serrations. By upsetting the metal in this manner, a fluid-tight sealing surface is effected between the inner and outer shells so as to prevent any possible leakage between these members. One or more continuous beads or serrations are also provided on the radial flange of the inner shell or channel member so as to positively seal between the abutting or contacting faces of the sealing element or diaphragm and the inner shell member.

Further objects, advantages and capabilities will become apparent from the following description and disclosure or are inherent in the device.

In the drawing:

Fig. 1 is a view in vertical cross section through the novel seal.

Fig. 2 is a view, part in side elevation and part in vertical cross section, taken on the irregular line 2—2 of Fig. 1.

Fig. 3 is an enlarged fragmentary perspective view showing in vertical cross section the novel seal and more clearly illustrating the details of construction.

Fig. 4 is a view in vertical cross section of the parts reversed to form an external seal.

Referring more particularly to the disclosure in Figs. 1 to 3, inclusive, in which views are shown an internal type seal adapted to be mounted in or anchored onto a surrounding or adjoining housing by a press fit, with the sealing diaphragm 1 in wiping contact with a concentric shaft 2 shown in dotted outline. The purpose of the seal is to prevent the passage or escape of oils, lubricants or other fluids, and to exclude dust and other foreign particles from the space between the shaft and its surrounding housing. The diaphragm may be of any material suitable for the purpose.

The novel seal includes a sectional retainer or retaining shell comprising an outer shell member or retaining section 3, an inner shell member or retaining section 4 adapted to be housed within the outer shell section and an annular, slightly bevelled washer or member 5. Each of the retaining sections or shell members is of substantially L shape with the inner section conformably seating within the outer section by a press fit and clamped therein by the turned over or spun edge 6. The inner side of the radial flange 7 of the inner section is provided with one or more spaced annular beads, ribs or serrations 8 adapted to become embedded in the radial or anchoring flange 9 of the sealing diaphragm 1. The lateral flange 10 of this inner section has its upper or exterior surface beaded or serrated as at 11 whereby to provide one or more beads or ribs so as to tightly engage with a sealing contact the interior side of the lateral flange 12 of the outer section 3 to thereby seal against possible leakage therebetween. The metal so upset at 8 and 11 forms a continuous sealing contact adding greatly to the efficiency and effectiveness of the seal in preventing leakage or passage of fluids between the elements composing the seal construction.

One side or face of the flange 9 of the sealing diaphragm abuts the radial flange 7 and the annular washer 5 engages the opposite side of this anchoring flange 9, thereby securely retaining the diaphragm in its predetermined, fixed position. This washer in turn is retained or locked in position by means of suitably spaced prongs or projections 13 stamped or cut out from the material of the lateral flange 10 and turned down or bent back or inwardly in the manner shown in Fig. 3. The annular washer 5 is of spring metal and preferably frusto-conical or bevelled inwardly at its inner diameter so as to securely lock and retain the diaphragm in proper position for continuous operation. The prongs 13 may be any suitable number, the embodiment selected to illustrate the invention having six, although such number may be reduced or increased, as desired.

In order to maintain the sealing or wiping face in contact with the shaft, a garter spring 14 is provided to exert a yielding pressure against the diaphragm adjacent its free edge, and is retained against accidental dislodgment by means of an annular groove or channel 15 and the inwardly projecting radial flange 16 of the outer section.

In Fig. 4 the parts have been reversed so as to provide an external type seal, with the retainer mounted by means of a press fit upon the shaft 2 and the sealing diaphragm 1 having a wiping contact with the surrounding housing or adjoining structure. The garter spring 17 in this form is expansible while in the internal type seal, the spring 14 is contractile. Otherwise, except for reversal, the parts are similarly constructed and like reference characters have been applied.

From the above description and the disclosure in the drawing, it should be apparent that the invention comprehends a novel seal construction in which the assembled elements are mounted and maintained as an integral unit providing a most effective seal to prevent the passage or transmittal of oil, dust or other fluids through or around the retaining shell and sealing diaphragm. The construction permits uniform standardization and due to the double wall construction of the retainer, the seal will withstand the most severe service without distortion, damage or danger of leakage.

Having thus disclosed the invention, I claim:

1. A retaining shell for an oil seal diaphragm adapted to seal the space between a rotatable shaft and its adjoining housing, comprising a pair of annular substantially L-shaped telescopic sections secured together to form a unit assembly of channel-shape having a double-walled portion with the inner wall portion abutting the flange of the other wall portion, said unit being adapted to be mounted by a press-fit in the adjoining housing, and means for mounting the diaphragm within the inner of said telescopic sections and out of any contact with the other section, said means including a radial flange on the diaphragm seating against the flange of the inner section, a washer seating against the radial flange of said diaphragm, and projections on said inner section engaging the washer to hold the same in seating engagement with the flange of said diaphragm for retaining the diaphragm in anchored position.

2. In an oil seal or grease retainer adapted to be mounted as an assembled and self-contained unit in a housing about a shaft, a flexible sealing diaphragm and a retaining structure therefor comprising a pair of substantially L-shaped telescoping sections forming a channeled hollow member receiving an end of the sealing diaphragm, and means for securely anchoring said end in the retaining structure and including a frusto-conical washer seating against said end to wedge and lock it against removal or displacement.

3. In an oil seal or grease retainer including a flexible sealing diaphragm, a retaining shell for securely mounting the sealing diaphragm and comprising an inner and an outer member interconnected to form a unitary assembly, and means for securely mounting the sealing diaphragm in the inner of said members, said means comprising a frusto-conical washer bearing against an anchoring portion of the sealing diaphragm, and spaced projections on the inner of said members bearing against said washer for maintaining it in anchored position.

4. In an oil seal construction for sealing the space between a pair of relatively rotatable members such as a shaft and its adjoining housing, a flexible sealing diaphragm adapted to have a wiping contact with one of said members and means for mounting said diaphragm upon the other member, said means comprising a pair of sections secured together in telescopic relationship and each provided with a cylindrical wall and an annular flange forming a channel-shaped assembly, and means for mounting and anchoring the diaphragm in the inner of said sections and comprising the flange on the inner section against which the diaphragm seats, a washer abutting the diaphragm and wedging the diaphragm between it and the last mentioned flange, and projections on said inner section and engaging the washer to retain the washer against the diaphragm and prevent removal or displacement thereof.

JOHN H. VICTOR.